No. 816,627. PATENTED APR. 3, 1906.
J. A. WATT.
CART.
APPLICATION FILED JAN. 31, 1905.
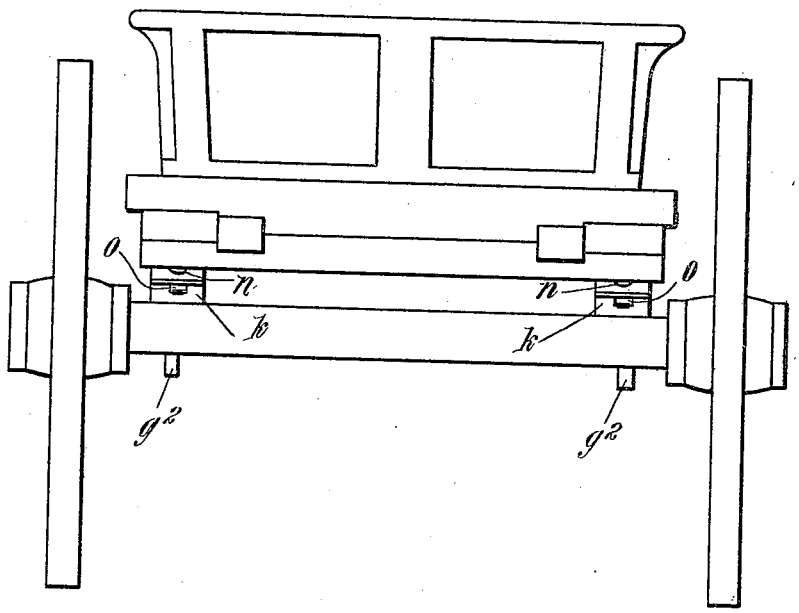
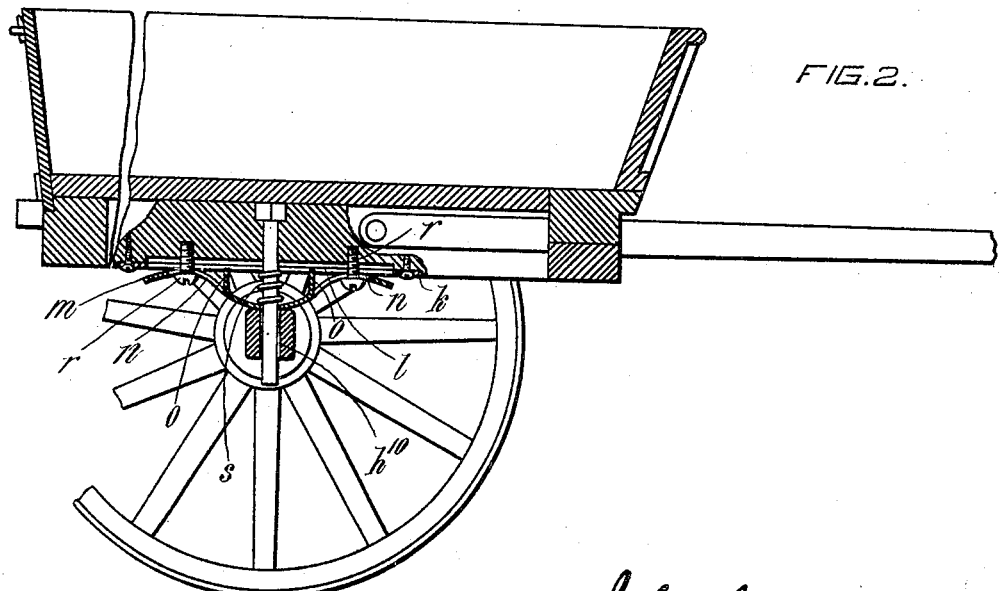
Witnesses
John Alexander Watt
Inventor
By Attorney

UNITED STATES PATENT OFFICE.

JOHN ALEXANDER WATT, OF HALIFAX, CANADA.

CART.

No. 816,627.  Specification of Letters Patent. Patented April 3, 1906.

Application filed January 31, 1905. Serial No. 243,469.

*To all whom it may concern:*

Be it known that I, JOHN ALEXANDER WATT, of the city of Halifax, Province of Nova Scotia, Dominion of Canada, have invented certain new and useful Improvements in Carts; and I do hereby declare that the following is a full, clear, and exact description of the same.

My invention relates particularly to dump-carts, although some of the features thereof can be applied with advantage to other vehicles.

The invention relates particularly to the spring mechanism and may be said briefly to consist of the combination of an axle having vertical perforations, of a pair of pins carried by the cart-body and projecting into the perforations, and a yielding resistance device between the vehicle-body and the axle. For full comprehension, however, of the invention reference must be had to the accompanying drawings, forming a part of this specification, in which like symbols indicate the same parts, and wherein—

Figure 1 is a front view of a dump-cart provided with my invention, and Fig. 2 is a longitudinal vertical sectional view thereof.

The body of the cart is connected to the axle by a pair of pins $q^2$, carried by such body and projecting through holes $h^{10}$ in the axle, in which they are slidably located.

A pair of bearing-plates $k$ are secured upon the bottom of the cart-body, one at each side thereof. They are longitudinally slotted, as at 1, and perforated to allow the passage therethrough of the pins $q^2$. A pair of bow-springs $m$, also perforated to allow the passage therethrough of the pins $q^2$, are located between the bearing-plates and the axle, and they have slots $n$ formed therein by having portions $o$ struck up therefrom. These struck-up portions constitute tongues which project into the slots in the bearing-plates, thereby localizing the springs and bearing-plates relatively to one another, while the displacement of the springs is furthur controlled by bolts $r$, projecting through the slots in the springs and secured in the cart-body. A pair of expansible helical springs $s$ encircle the pins $q^2$ and bear between the bearing-plates and the bow-springs.

What I claim is as follows:

1. The combination with the body portion of a vehicle and an axle having vertical perforations, of a pair of pins carried by the vehicle-body and projecting into the perforations, and a yielding resistance device between the vehicle-body and the axle.

2. The combination with the body portion of a vehicle and an axle having a pair of vertical perforations, of a pair of pins carried by the body and projecting into the perforations, a pair of bearing-plates upon the under side of the body one adjacent to each pin, a pair of bow-springs having their ends bearing slidably upon the bearing-plates and their convex sides in contact with the axle, and a pair of expansible helical springs bearing between the bearing-plates and the convex sides of the bow-springs.

3. The combination with the body portion of a vehicle and an axle having a pair of vertical perforations, of a pair of pins carried by the body and projecting into the perforations, a pair of slotted bearing-plates upon the under side of the body one adjacent to each pin, a pair of bow-springs having their ends bearing slidably upon the bearing-plates and their convex sides in contact with the axle, lugs carried by the bow-springs and having their ends located slidably in the slots in the bearing-plates and a pair of expansible helical springs bearing between the bearing-plates and the convex sides of the bow-springs.

In testimony whereof I have signed my name to this specification in the presence of two subscribing witnesses.

JOHN ALEXANDER WATT.

Witnesses:
J. A. CLARK,
C. A. B. BULLOCK.